United States Patent Office 2,907,342
Patented Oct. 6, 1959

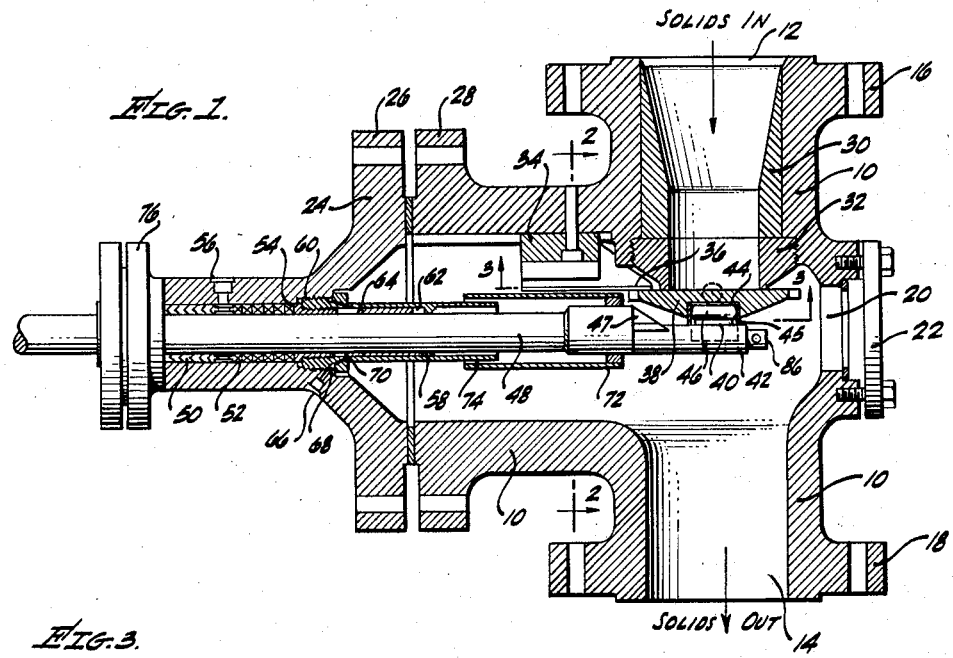

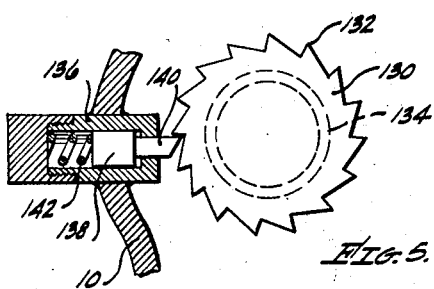
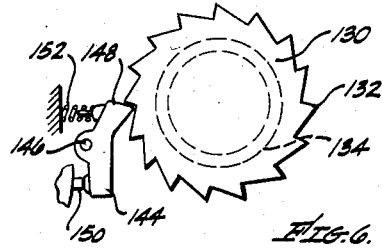
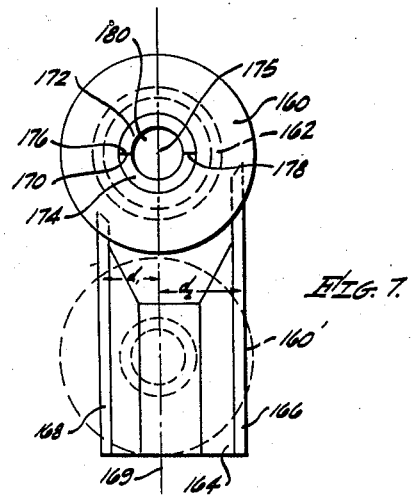
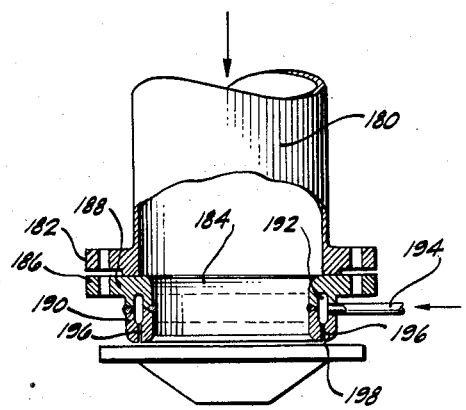
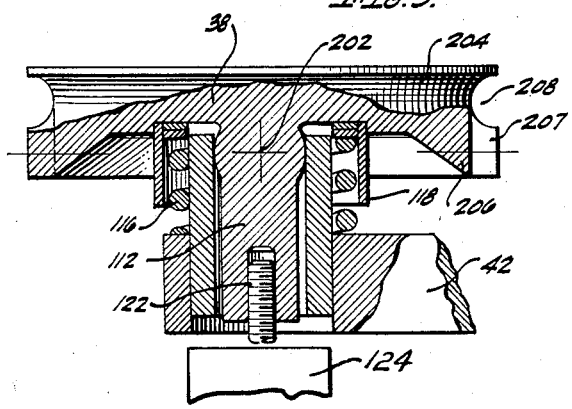

2,907,342

SOLIDS FLOW CONTROL APPARATUS

Clyde H. O. Berg, Robert D. Clark, John E. Hines, Jr., and Robert L. Switzer, Long Beach, Calif., assignors to Union Oil Company of California, Los Angeles, Calif., a corporation of California Application March 1, 1954, Serial No. 413,274

12 Claims. (Cl. 137—331)

This invention relates to an improved apparatus for handling granular solids and in particular relates to a novel valve for controlling the flow of granular solids through conduits, fluid-contacting apparatus, and the like. More specifically, this invention relates to an improved reciprocating slide valve for use in controlling the flow of granular solids and which is provided with a rotating valve plate whereby problems of solids abrasion and erosion of the valve plate and valve seat are substantially eliminated and which valve is also capable of sustaining high fluid pressure differentials.

Modernly granular solids are handled at extreme conditions of pressure and temperature and in great quantities in many industrial processes. Some of these processes include liquid and gas adsorption processes for fractionation of fluid mixtures, the many miscellaneous fluid-solids contacting processes in which either the solids or the fluid or both are chemically reacted or otherwise converted in the presence of the solid contact material such as in catalytic cracking, reforming, isomerization, desulfurization, and other catalytic treatment of hydrocarbons, as well as thermal treatment including contact coking of hydrocarbons in the presence of hot pebbles. Granular solids are handled in extremely great quantities in the field of solids conveyance generally in which solid materials are loaded and unloaded such as for example in the handling of ores, grains, solid chemicals of all types, and granular solids in general. Although conventionally in such processes bucket elevators and similar mechanical conveyances have been employed previously, the modern tendency is toward conveying them by means of the well-known pneumatic gas lift conveyer in which the solids are suspended in a fluid. Even more recently developed is a method in which such granular solids are conveyed by means of a relatively high pressure differential, the solids being in the form of a dense gravity-packed mass. In all of such types of conveyors and particularly in the last two mentioned, the improved apparatus of this invention is applicable to control the loading and unloading of granular solids from the various conveyors and to control circulation rates of granular solids in the aforementioned fluid-solids contact processes.

One major problem common to nearly all of these solids handling processes is that involving the erosion or abrasion or grinding of the exposed parts of the mechanical equipment by the more finely divided and often highly abrasive solid materials. This is particularly true where two or more metal parts are in sliding contact in the presence of such fine solids. The use of slide valves of various types in such processes has not heretofore been successful because of the excessive deterioration of the valve seat and plate by the fine solids.

Another problem encountered in such processes is the securing of fast valve action whereby the solids flow may be cut off or fully opened in relatively large conduits in the matter of a few seconds or less. This problem is accentuated in the apparatus employed to pressure granular solids cyclically into the newly developed apparatus for conveying dense masses of granular solids in conduits.

A third major problem has been the fluid leakage encountered in valves through which granular solids flow. Customarily a certain amount of the granular solids will bridge the valve plate apart from the valve seat so that fluid flow can continue although solids flow has been terminated.

Accordingly, the present invention is directed to an improved solids slide valve which is free from erosion and abrasion problems, closes and opens in extremely short periods of the order of one second or less, and which provides a completely fluid-tight seal capable of withstanding high differential pressures in a solids transfer system.

It is therefore a primary object of the present invention to provide an improved solids valve for the control of flowing granular solids in conduits, solids contact vessels, and the like. It is also an object of this invention to provide in such a valve a mechanism which is fast acting, free of mechanical erosion problems, and which provides a pressure-tight seal through which fluid leakage is minimal if not completely eliminated.

It is a more specific object of this invention to provide a reciprocating slide valve for granular solids systems in which a rotating valve plate is employed to eliminate localized valve seat and plate erosion by solids fines.

It is another specific object of this invention to provide a valve plate rotating mechanism which is completely automatic and self operating, being actuated by the reciprocal motion of the valve plate itself.

Another specific object of this invention is to provide an improved valve plate support and bearing mechanism which eliminates inertia effects of the fast valve action which tend to misalign the valve plate.

Other objects and advantages of the present invention will become apparent to those skilled in the art as the description thereof proceeds.

Briefly the present invention comprises an improved slide valve mechanism especially adapted to the control of granular solids flow through conduits, solids-fluid contacting equipment, and the like in which a mechanically actuated reciprocating valve arm is provided with an essentially flat valve plate which sets against a valve seat. The valve plate is supported on the valve arm by means of a special support including a bearing having a cylindrical surface mating against a spherical surface. The valve plate is preferably counterbalanced at a point below the bearing so as to bring the center of gravity into coincidence with the center of the spherical bearing surface. In this way extremely rapid reciprocal motion may be applied to the valve plate by means of the valve arm without danger of establishing overturning moments in the plate which tend to erode the moving parts.

The present device is preferably provided with an improved solids valve seat having a peripheral fluid manifold adjacent the valve seat surface and which communicates at a plurality of points directly with the valve seat surface. A source of fluid under pressure is provided and the fluid passes therefrom into the manifold and through the plurality of openings distributed along the valve seat surface to effect two results. First, the flow of fluid tends to sweep away granular solids fines present on the valve seat and valve plate to substantially eliminate granular solids erosion of the mating surfaces. Second, the flow of fluid provides a fluid cushion between the mating surfaces which tends to facilitate the opening and closing of the valve without mechanical wear.

In addition, a mechanical means, self actuating, is provided to rotate the valve plate step-wise during reciprocation so as to distribute any wear and erosion which does occur uniformly throughout the seating surfaces of the valve seat and the plate. Several mechanisms for effecting this plate rotation are described and illustrated below in more detail.

By providing in the mechanism of this invention the foregoing briefly described features, a solids valve has been constructed and operated in which the valve plate travel between its extreme positions may be completed in time intervals as short as 0.5 second in conduits having diameters up to about 10 inches and proportionally short transit times in the larger conduits without local erosion and deterioration of the mating surfaces of the valve and without fluid leakage through the valve when closed. In one installation, in which granular aluminum oxide base reforming catalyst has been circulated in an experimental pilot plant for gasoline reforming during substantially continuous operation for a period of 20 months, no maintenance on the valve of this invention has been found necessary and occasional inspection of the equipment during that time indicates that considerably longer useful life without maintenance can be expected.

The design and construction of the device of this invention is more clearly shown and will be readily understood from the accompanying drawings in which:

Figure 1 is an elevation view in cross section of one form of the device of this invention when constructed in a manufactured valve body and in which is detailed one modification of the valve plate support bearing.

Figure 2 is an end elevation view in cross section looking from the left end of the device in Figure 1 showing particularly the valve plate guide structure and one modification of the mechanical means for rotating the valve plate, Figure 3 is a view looking upwardly at the valve plate and guide mechanism of Figures 1 and 2 showing in further detail the nature of the valve plate periphery and the means for its rotation in which the turning of the valve plate is effected at the end of each plate stroke, Figure 4 is an enlarged elevation view in partial cross section of the valve plate and another modification of the plate support bearing showing the counterbalance device whereby the reciprocating force is applied directly to the center of gravity of the valve plate mechanism, Figures 5 and 6 show detailed views of two other modifications of the valve plate rotating mechanism in which the rotation is effected at the beginning of each plate stroke, Figure 7 shows a view similar to that shown in Figure 3 and illustrates a valve plate rotation design utilizing materials in contact with each other which have different coefficients of friction whereby upon valve plate reciprocation a net turning force is effected to move the valve plate in successive steps in either a clockwise or counter-clockwise direction, Figure 8 shows a detailed view in partial cross section of the manifolded valve seat described briefly above and also indicates the application of the device of this invention to a conduit carrying granular solids rather than employing a valve body as in Figure 1, and Figure 9 shows a semi-detailed view in cross section of a modified valve plate in which the forces for reciprocating the valve plate as well as the turning forces for rotating the plate are all applied in the plane of the center of the gravity of the valve plate mechanism whereby all misalignment forces are eliminated from the device.

Referring now more particularly to Figure 1, a side elevation view in cross section of one modification of the improved solids valve of this invention is shown. Valve body 10 is provided with inlet opening 12 and outlet 14 and flanges 16 and 18 for connection to the conduit through which granular solids flow control is desired. Port 20 covered by flange 22 is also provided for inspection as well as assembly of the device of this invention. Bonnet 24 is also provided as is customary in conventional valves and is connected to the valve body by means of flanges 26 and 28.

The valve body is modified for this particular service by providing a downwardly tapering throat 30 which reduces somewhat the inlet diameter so that valve seat 32 may be inserted. In addition, a portion of the valve body immediately adjacent the solids inlet is milled out to provide for the fastening of valve plate guide element 34 having valve plate guides 36 which extend to points immediately adjacent the edge of valve seat 32. The plane of guides 36 is the same as that of the valve seat itself so that upon reciprocation of the open and closed position, valve plate 38 rests either upon valve seat 32 or guides 36.

Valve plate 38 is supported by a spring-loaded bearing 40 which in turn is supported from arm 42. In the modification of spherical-cylindrical bearing 40 shown in this figure, an opening 44 having cylindrical bearing surface walls is provided in the underside of valve plate 38 as in the collar 45 attached thereto and into which is extended projection 40 having spherical surface 46. The spherical bearing surface 46 engages cylindrical walls of opening 44. The internal parts of bearing 40 include a compression spring, analogous to those shown in Figures 4 and 9 disposed within projection 40 and which forces valve plate 38 upwardly against valve seat 32. Thus, even in the absence of a high pressure below plate 38, a mechanical force exerted by the spring maintains a fluid-tight contact between plate 38 and seat 32.

Arm 42 is reciprocated by means of shaft 48 to which the arm is directly connected. Shaft 48 extends to the left outwardly through bonnet 24 to a suitable reciprocating means such as a pneumatic or hydraulic cylinder, solenoid, rack and pinion gear system, or other means for shaft reciprocation. The pneumatic cylinder is preferable for fast valve action with minimum inertia effects. Shaft 48 is provided with a plurality of packing seals including shaft packings 50 and 52 and packing retainer ring 54. Inlet 56 is provided for the introduction of shaft lubricant to insure fast and smooth reciprocation. The shaft is also provided with primary or inner dust sleeve 58 which surrounds shaft 48 and is threaded into bonnet 24 by means of thread 60 which in turn backs up the retainer ring. Primary dust sleeve 58 surrounds shaft bushing 62 and provides purge gas manifold 64 between it and retainer ring 54. Shaft purge gas is introduced through inlet 66, enters primary manifold 68, and flows therefrom through duct 70 into shaft manifold 64. This purge gas, being under pressure, provides a minute leakage or purge stream into the system along shaft 48 and within primary dust sleeve 58. Shaft 48 is also provided with secondary or outer sleeve 72 which extends from a point adjacent valve plate 38 toward primary dust sleeve 58. Secondary dust sleeve 72 is larger in diameter and surrounds at all times the end of primary dust sleeve 58. The purge gas passes into outer dust sleeve 72 and then reverses its direction and flows into the valve body through the annular space 74 existing between the overlapped portions of sleeves 58 and 72. The purpose of the purge gas is to prevent the migration of minute granular solids into the shaft seals and packing whereby shaft erosion would result.

Shaft 48 is fabricated from relatively heavy material to minimize deflections which would displace valve plate 38 from seat 32. To assist in the stiffening of this shaft, a substantial length of bonnet height between flange 26 and flange 76 is employed to provide space for the packing seals described above and to act in conjunction with the packings as a shaft bearing. Further support for the shaft is shown in Figure 2 described below.

Referring now more particularly to Figure 2, in which identical elements of Figure 1 are designated by the same numbers, an end view of the apparatus of Figure 1 is shown looking from the left along shaft 48 toward valve plate 38 and valve seat 32. Valve guide support 34 and the guides 36 are shown positioned against milled surface 78 provided for them in the upper part of the valve body. A portion of shaft arm 42 is apparent from which extend support elements 80 and 82. These elements, omitted from Figure 1 for purposes of clarity, serve to support the extreme end of shaft 42 on slide bearings 84 and 86 which are positioned into milled slots running along the internal sides of valve body 10 and also to prevent any shaft rotation which would misalign the support bearing. This structure is preferable when large diameter valve plates are employed such as about 8 inches and above. The bearing surface of supports 80 and 82 are surface hardened. In smaller valves this additional bearing is not required for support, but is still desirable to prevent any rotation of the shaft.

In this figure the notched or saw-toothed periphery 88 provided valve plate 38 is apparent, as is also indicated in Figure 3 described below. Extending inwardly through the opposite walls of valve body 10 are stops 90 and 92 which extend into engaging position with the saw-toothed periphery of valve plate 38. Their longitudinal axes lie respectively substantially along the lines drawn through the center of valve plate 38 at each extremity of its travel and at right angles to the direction of reciprocation. Thus, as is indicated in Figure 3, the saw-toothed periphery successively engages stops 90 and 92 in alternation at the ends of the valve plate travel so as to rotate the valve plate in a given direction when the plate is reciprocated. Stops 90 and 92 are adjustable, being threaded and provided with lock nut 94 and cap 96.

Referring now more particularly to Figure 3, a view taken from the underside of valve plate 38 is shown clearly indicating stops 90 and 92 and their positions relative to the extreme valve plate positions. Valve plate guides 36 are shown extending up to a point immediately adjacent valve seat 32. Valve plate 38 shown in full view in this figure represents the valve in the closed position whereas valve plate 38' shown to the left by dotted lines indicates the valve plate position when the valve is wide open. The saw-toothed periphery of valve plate 38 is clearly shown and it is readily apparent how the position of stationary engager stops 90 and 92 effect the rotation of valve plate 38 when the plate is reciprocated between the two extreme positions shown. In this drawing valve plate 38 is provided with 9 saw-toothed points spaced 40° apart and of sufficient depth so that tooth 98 engages stop 92 at the end of the closing stroke causing valve plate 38 to turn approximately 20° which brings tooth 100 into direct line with stop 90 so that tooth 100 will engage stop 90 at the end of the opening stroke to cause the plate 38 to turn another 20° which in turn brings tooth 102 into line with stop 92. The steps are repeated successively with each opening and closing stroke thus distributing any wear uniformly over the entire valve plate and valve seat. It is apparent that in this modification of means for turning the valve plate the turning is accomplished at the end of each individual stroke. Usually in operation this is a higher velocity than that at the beginning of each stroke. Accordingly a solid impact is applied to the plate and a positive rotation is obtained. This type of engager stop is preferred in the slower acting valves. In the modifications shown in Figures 5 and 6, to be described below, the rotation is imparted at the low velocity part of the stroke, namely at the beginning of each valve plate movement, and are to be preferred in larger and fast-opening valves.

Referring now more particularly to Figure 4, an elevation view in cross section is given detailing another modification of the knuckle and spherical-cylindrical bearing assembly for connecting the valve plate 38 to arm 42. In this drawing the saw-toothed edge 88 of valve plate 38 is again apparent. Arm 42 is provided adjacent its end with an opening 104 within which an internal collar 106 is positioned. At the upper end of this collar is provided a surface-hardened portion 108 which may or may not be removable. If desired, to facilitate replacement of this outer cylindrical portion of the bearing, insert 110 may be made removable by means of threads as shown.

Extending downwardly from plate 38 into and substantially through inner collar 106 is a boss or projection 112 provided with a spherical bearing surface 114 positioned so as to readily engage cylindrical bearing surface 108. It should be noted in this modification that the movable bearing surface is spherical and the stationary bearing surface is cylindrical while in Figure 1 the stationary bearing surface was spherical (surface 46) and the movable bearing surface was cylindrical (44). In either case the advantages described above are obtained when a bearing having an engaging pair of cylindrical and spherical surfaces is employed.

Surrounding collar 106 in Figure 4 is compression spring 116 which is positioned within guard collar 118 and extends from the upper surface of arm 42 to the lower surface 120 at the bottom of valve plate 38. The inner plate projection 112 is provided at its lower extremity with threads to accommodate a screw 122 which may be used in assembling the apparatus to draw plate 38 downwardly against the compression spring toward arm 42 so as to insert the valve plate-knuckle-arm assembly into the valve body. Afterwards it may be used to suspend weight 124 from the bottom of projection 112 so as to lower the center of gravity of the entire rotatable plate to point 126, that is, into coincidence with the plane of the contact of the spherical-cylindrical bearing elements. In this manner, the forces of reciprocation, which are applied to the valve plate through the knuckle assembly at relatively high accelerations and decelerations, may be effected in the total absence of moments tending to overturn the valve plate or otherwise misalign it with the plane of valve seat 32 and valve plate guide 36. In so doing, another source of equipment wear is sucessfully eliminated.

In Figure 4, bearings 128 are shown at the upper end of compression spring 116. These bearings are desirable although optional and may be substituted with a pair of washers such as those shown in Figure 9.

The important features and advantages of this ball-in-cylinder type bearing, discussed in connection with Figures 1 and 4 are essentially as follows:

Misalignment of the valve disc and seat is compensated for by the spherical section which mates with a cylindrical section. The use of the sphere-in-cylinder principle permits vertical motion to seat the valve disc and limited "ball joint" action to correct for misalignment, with simplicity and minimum friction. The contacting surfaces on the sphere and cylinder are either hardened or hard-surfaced to minimize wear. The cylindrical section beneath the "ball" serves two purposes; to limit the "ball joint" action, and to provide a means of compressing the spring during assembly. The center of the "ball" is located on the center line of the push rod and as near as possible to the center of gravity of the valve disc to prevent overturning moments set up by the high inertia forces developed by rapid opening and closing the valve, which would cause uneven and excessive wear on the valve seat and disc. The "ball joint" is stabilized and the valve disc is held against the seat by a helical compression spring which acts through a ball bearing thrust bearing to reduce friction. The thrust bearing and the "sphere-in-cylinder" are lubricated with molybdenum disulfide and protected from catalyst pellets, fines, etc. by a shield around the spring. To prevent large catalyst pellets or particles from clogging the spring, the top of the transition section between the end of the push rod 48 and the valve disc support 42 is shaped with a knife edge 47. This construction assures that solids falling off the back of the plate will fall free and not accumulate.

This design is a distinct improvement over the conventional ball and socket type (entirely spherical) bearing because in the present device operating at high temperatures, it is practically impossible to lubricate such a conventional bearing, the large area of contact results in galling and freezing of the bearing surfaces, and the presence of solids particles such as the solids fines or dust cause rapid erosion of such bearings. Further, such bearings prevent any vertical movement of the movable member of the bearing to thus interfere with the maintenance of a tight sealing of valve 38 against seat 32. In the present spherical-cylindrical bearing structure there is a minimum contact area in the bearing which minimizes frictional resistance to rotation, vertical movements are permitted to maintain fluid-tight setting of the valve plate, and other advantages are realized which are impossible in the conventional bearing discussed.

Referring now more particularly to Figure 5 a modified means for rotating the rotatable valve plate of this invention is shown. Figure 5 views a view of the valve plate in the same direction as in Figure 3. A valve plate 130 is shown provided with a notched or saw-toothed periphery 132 and is shown in the closed position covering valve seat 134. Extending through the wall of valve body 10 or otherwise disposed immediately adjacent the closed position of valve plate 130 is cylindrical housing 136 containing a spring-loaded piston 138 having a projection 140 as a movable engaging stop extending into latch engaging relationship with the saw-toothed periphery 132 of the valve plate. Spring 142 maintains projection 140 against the saw-toothed periphery 132 so that when valve plate 130 is reciprocated toward the open position, a turning movement is applied to the valve plate as it starts its movement toward its open position. As the plate returns to the closed position a re-engagement of the saw-toothed periphery with projection 140 is effected by a displacement of the projection radially away from the center of the valve plate, spring 142 causing projection 140 to snap into engagement with a tooth of periphery 132. It is to be understood that the mechanism shown at the left in Figure 5 can be disposed instead on the opposite side of Figure 5 and at the other extreme or open position of the valve plate reciprocation. Such an arrangement effects the valve plate rotation as the plate is started toward the closed position. If desired both modifications can be used.

Referring now more particularly to Figure 6, a modified form of the device shown in Figure 5 is also shown and in which identical elements are numbered the same. The plate 130 is shown closed. In this modification a lever 144 is pivoted at 146 and provided with an engaging end projection 148. Stop 150 is provided at one end of lever 144 to maintain projection 148 in engagement with saw-toothed periphery 132 and to turn valve plate 130 as the valve plate begins movement toward the other extremity of valve travel. Lever 144 is spring-loaded by means of spring 152 adjacent projection 144. The rotation is effected when the stroke toward the open position is started as in Figure 5. A duplicate of lever 144, not shown, can be employed instead at the other or open extreme of valve travel, its structure and operation being identical with the description and illustration of lever 144, except that rotation is effected when the stroke toward the closed position begins. As in Figure 5, both modifications can be used if desired.

In Figure 7 is shown a further modification of a device for rotating the valve plate during reciprocation thereof, which modification employs no moving parts or stops as is the case in the preceding described modifications. In this figure the view is upward from below the valve plate similar to the view in Figure 3. In this figure valve plate 160 is shown in the closed position covering valve seat 162, valve plate 160' indicated by dotted lines is shown in the open position. As before, a valve plate guide support 164 is provided having valve guides 166 and 168.

The principles of operation of this device involve the use of materials in sliding contact which have different coefficients of friction so that when the valve plate is reciprocated in actual operation, the friction acting at opposite transverse extremes of the valve plate are not the same. This generates a net turning moment which causes the valve plate to rotate when it is moved from one extreme to the other of valve plate travel. This alone is insufficient since on the return movement these same forces would act in the reverse direction and turn the valve plate back to its original position. However, by additionally providing in the non-rotatable member of the spherical-cylindrical support bearing described in Figures 1 and 4, materials of different coefficients of friction, the friction force of the bearing itself tending to resist plate rotation when the valve is moved in one direction may be made different from the friction force resisting the return plate rotation when the valve plate is moved on the return stroke. By this means, a net turning effect causes the valve plate to progress in one direction during a series of forward and backward steps in which the forward step is greater than the backward step.

Referring again to Figure 7 stationary bearing element 170 is shown provided with two sections 172 and 174 having different coefficients of friction against plate 160, which elements are arranged around the center of rotation 175 so that the plane passing through the adjacent surfaces 176 and 178 at which they are in contact, is transverse to the axis of valve plate travel, e. g. element 172 is disposed substantially entirely on the closed position side and element 174 is disposed entirely on the open position side of the imaginary plane passing through the center of rotation 175 of valve plate 160, and transverse to the stroke axis.

In one modification of this device valve guides 166 and 168 are placed equidistant from the axis of valve travel, guide 168 is provided with a low coefficient material while guide 166 is provided with a high coefficient material relative to the valve plate. As plate 160 progresses from the open position 160' shown toward the closed position shown, valve plate 160 will tend to rotate in a clockwise direction. To facilitate this turning, element 172 of the fixed member of bearing 170 is provided with a low coefficient material and element 174 is provided with a high coefficient material. On the return stroke toward open position 160' the movable bearing element, in this drawing represented by element 180, bears against the high coefficient material 174 and provides a greater resistance to the counterclockwise return rotation of the valve plate. A net clockwise rotation of valve plate 160 is hereby obtained.

In a second modification of the device of Figure 7, guides 166 and 168 may be placed at different perpendicular distances $d_1$ and $d_2$ from the stroke axis 169 of valve plate travel so as to increase the valve plate rotation by increasing the frictional turning movement, that is, by placing the low coefficient guide 168 nearer the center of rotation and the high coefficient guide 166 farther from the center of rotation of valve plate 160.

In some cases it is possible to effect valve plate rotation by providing valve guides 166 and 168 with materials having the same coefficients of friction and placing them at different distances from the valve plate axis, in combination of course with the use of the two materials having different coefficients of friction in the non-rotatable element of the support bearing as shown in Figure 7.

Valve plate rotation in the opposite direction, that is, counterclockwise, may of course be obtained by reversing the coefficients of friction in either the stationary bearing element or in the plate guides. Reversal of both will maintain the same direction of rotation described above.

Referring now particularly to Figure 8, a modified valve seat for the device of this invention is shown in detail, and incidentally in a structure which does not employ a conventional valve body. In this figure conduit 180 is provided for solids passing downwardly from a source not shown. The conduit is provided with lower flange 182 which engages with flange 186 having valve seat 184. Valve seat 184 is fabricated from circular sections, including upper section 188 and lower section 190. In each of these sections a circular slot is milled in the surfaces designed to face one another so that upon welding the lower and upper sections together during fabrication ring manifold 192 is formed immediately adjacent valve seat surface 198. A purge gas inlet 194 opens into manifold 192. Apertures 196 are drilled through the valve seat surface 198 entirely around the valve seat directly into manifold 192. A purge fluid, usually gas, is introduced through line 194 and passes from manifold 192 through the plurality of holes 196 directly onto the bearing surface 198 of valve seat 184. As stated above, this purge fluid flow tends to sweep away abrasive solids fines and to provide a fluid cushion which materially reduces wear of the valve seat and plate 38.

Referring now more particularly to Figure 9, a modification of the support bearing of Figure 4 is shown in which both the plate turning forces and the reciprocating forces are applied directly in the plane of the center of gravity 202. Valve plate 204 is provided with a skirt 206 disposed immediately below the peripheral groove 208 of valve plate 204. Peripheral skirt 206 has the same saw-toothed edge as the valve plates shown in Figures 3, 5 and 6 and is disposed in the same plane as center of gravity 202. The forces applied to faces 207 to turn valve plate 204, as in the modifications of Figures 3, 5, and 6, thus are applied in the same plane as the center of gravity eliminating any tendency for the rotating force to upset the plate and misalign it. All the normal forces, rotary and reciprocal, tending to overturn or misalign plate 204 from the plane of its travel are entirely eliminated. It should be noted that other elements shown in Figure 9 which are the same as elements shown in Figure 4 are herein designated by the same numbers.

It is to be understood that Figures 1 and 2 have been described in connection with a valve body in the device of this invention, but a valve seat may be provided at the outlet end of a simple conduit and the moving mechanism of this invention may be supported by extraneous supports and no valve body employed. For example, such an apparatus may be constructed within a solids-fluid contact column adjacent the lower opening of a solids downcomer therein without the necessity of using a conventional valve body corresponding to element 10 in Figure 1.

It is apparent from the foregoing description and illustration that the device of this invention provides improved features not available in the conventional means for controlling solids flow. As an example of the present invention, solids valves according to the description herein have been constructed and installed in a pilot gasoline reforming plant for the experimental processing of naphthenic gasoline at a rate of 25 barrels per day by contact at 400 pounds per square inch gauge and at about 900° F. with a downwardly moving bed of cobalt molybdate reforming and desulfurization catalyst. The valves according to this invention are installed at the upper inlet and lower outlet of a solids pressuring chamber disposed immediately below the contacting column. The conduits opening into and out of the pressuring chamber are 2 inches in diameter, the valve plates during normal operation reciprocate at a rate of 4 complete strokes per hour, the time required for one-half stroke is 0.5 second and the valves when closed successfully withstand very high pressures in the direction tending to close them without noticeable fluid leakage. These pilot plant valves are reciprocated automatically by means of air-operated cylinders connected to and actuated by a cycle timer instrument.

This pilot plant has been in operation substantially continuously for 20 months during which time the valve mechanisms were inspected from time to time and after this length of operation they show no sign of wear even in the presence of the abrasive alumina base catalyst employed.

It should also be understood that the device of this invention is not intended to be limited to use with any particular type of solids or in any particular type of solids-fluid contacting or conveyance operation. The device is applicable to any process in which the flow of granular solids is required to be controlled.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

We claim:

1. In a valve apparatus for controlling flowing granular solids which comprises a valve body through which solids flow, a valve seat integrally attached in said body, a plurality of straight valve plate guides disposed adjacent to and in the same plane as said valve seat, a valve plate adapted to slide back and forth between said valve seat and said valve guides to open and close the valve, a reciprocable shaft disposed adjacent and parallel to said guides, and a support bearing supporting said valve plate on said shaft, the improvement which comprises means to reciprocate said shaft, means for rotating said valve plate during such reciprocation, a primary dust sleeve surrounding a substantial length of said shaft and extending inwardly toward said valve plate, a secondary dust sleeve sealed to said shaft adjacent said valve plate and extending outwardly along said shaft and overlapping said primary dust sleeve, means for introducing a purge fluid along said shaft and within the overlapping dust sleeves to prevent introduction of solids fines adjacent said shaft, and a loading mass integrally attached to a projection from said rotatable plate which extends through said support bearing to support said mass on the opposite side of said bearing from said plate, said loading mass being of a weight sufficient to bring the center of gravity of the rotating system comprising said plate, said projection, and said mass, into coincidence with the center of said support bearing to eliminate valve plate overturning forces otherwise generated by reciprocation of said valve plate.

2. In a fast opening and fast closing valve apparatus for controlling the flow of granular solids streams which comprises a conduit through which granular solids flow, a valve seat integrally attached to said conduit, a pair of parallel valve plate guides disposed adjacent and in the same plane as said valve seat, an elongated reciprocable shaft disposed parallel to said guides, a spring-loaded support bearing attached to the end of said shaft, a rotatable valve plate supported by said bearing in the plane of said valve seat and guides, means for reciprocating said shaft so as to reciprocate said valve plate rapidly between a closed position against said seat and an open position against said guides, and at least one mechanical engager stop disposed adjacent one end of the stroke of said valve plate and adapted to engage one side of said plate so as to impart a rotary movement thereto during part of said stroke whereby non-uniform wear of said valve seat and plate is eliminated, the improvement which comprises a projection from said rotatable plate extending through said support bearing, said support bearing having mating cylindrical and spherical bearing surfaces, a loading mass integrally attached to said projection on the opposite side of said bearing from said plate, said loading mass being of a weight sufficient to bring the center of gravity of the rotating system comprising said plate, said projection, and said mass into coincidence with the center of said spherical bearing surface in said support bearing to eliminate valve plate overturning forces otherwise generated by reciprocation of said valve plate, at least one fluid shaft seal disposed along the length of said shaft, a primary dust sleeve supported in a stationary position at its outer end and extending inwardly toward said valve plate and surrounding a substantial length of said shaft, a secondary dust sleeve integrally attached and sealed at its inner end to said shaft at a point adjacent said support bearing and extending outwardly surrounding said shaft toward its outer end a distance sufficient to overlap said primary dust sleeve at all positions of the valve plate stroke, and an inlet means for purge fluid opening adjacent the surface of said shaft to pass purge fluid along said shaft and into the overlapping dust sleeves to prevent introduction of solids fines onto the surface of said shaft.

3. An apparatus according to claim 2 wherein said rotatable valve plate is provided with a saw-tooth periphery for engaging with said mechanical engager stop to rotate said plate, said saw-tooth periphery being disposed substantially in the same plane with the center of said spherical bearing surface to eliminate plate overturning forces otherwise generated by the plate rotation forces.

4. An apparatus according to claim 2 in combination with a pair of elongated slide bearings, said bearings being supported in positions parallel to said plate guides and on the opposite side of said valve plate therefrom, and a support member integrally attached transverse to said shaft and in sliding contact at its end with said slide bearings to support the end of said reciprocable shaft adjacent said valve plate and to prevent shaft rotation of said shaft during reciprocation thereof.

5. An apparatus according to claim 2 wherein said spring-loaded support bearing comprises an inner collar supported at one end thereof on said shaft and having a cylindrical bearing surface therein, said valve plate being disposed across the other end of said inner collar, an outer collar attached at one end to said valve plate and surrounding said inner collar leaving an annular space therebetween, a compression spring disposed within said annular space, and a bearing within said annular space at one end of said spring to permit said valve plate to rotate, said projection having an outer spherical bearing surface and extending from said plate substantially entirely through said inner collar and forming a spherical-cylindrical support bearing therewith in which the spherical element rotates relative to the cylindrical element.

6. An apparatus according to claim 2 wherein said spring-loaded support bearing comprises a cylindrical projection having an external spherical portion supported at the end of said shaft, a compression spring associated with said projection, and a cylindrical collar extending from said valve plate around said projection forming a spherical-cylindrical support bearing in which the cylindrical collar rotates relative to the spherical element.

7. In a shaft sealing device which comprises a reciprocable shaft and sealing means disposed in direct contact with the surface of said shaft, the improvement for preventing adverse effects of abrasive solids in said device which comprises a primary dust sleeve surrounding a substantial length of said shaft and extending inwardly from said sealing means toward the end of said shaft, a secondary dust sleeve sealed to said shaft adjacent said end and extending backwardly along said shaft and overlapping said primary dust sleeve at all stages of reciprocation of said shaft, and means for introducing a purge fluid at the outward end of said primary dust sleeve so as to flow along said shaft and through the overlapping dust sleeves to prevent introduction of solids fines into said sealing means upon reciprocation of said shaft.

8. In a valve apparatus for controlling flowing granular solids which comprises a valve body through which solids flow, a valve seat within said body, a plurality of valve plate guides disposed adjacent the edge of said valve seat, a valve plate adapted to slide back and forth so as to be alternately in contact with said valve seat and said valve guides and thereby alternately close and open the valve, a reciprocable shaft extending into said valve body, a support bearing supporting said valve plate near the inner end of said shaft, sealing means disposed in direct contact with the surface of said shaft adjacent the point at which it enters said valve body, and means to reciprocate said shaft, the improvement which comprises means for rotating said valve plate during such reciprocation, a primary dust sleeve surrounding a substantial length of said shaft and extending inwardly from said sealing means toward said support bearing, a secondary dust sleeve sealed to said shaft adjacent the support bearing end thereof and extending outwardly along said shaft and overlapping said primary dust sleeve at all stages of reciprocation of said shaft, and means for introducing a purge fluid at the outward end of said primary dust sleeve so as to flow along said shaft and through the overlapping dust sleeves to prevent introduction of solids fines into said sealing means upon reciprocation of said shaft.

9. In a fast opening and fast closing valve apparatus for controlling the flow of granular solids streams which comprises a conduit through which granular solids flow, a valve seat integrally attached to said conduit, a pair of parallel valve plate guides disposed adjacent and in the same plane as said valve seat, an elongated reciprocable shaft disposed parallel to said guides, a spring-loaded support bearing attached to the end of said shaft, a rotatable valve plate supported by said bearing in the plane of said valve seat and guides, and means for reciprocating said shaft so as to reciprocate said valve plate rapidly between a closed position against said seat and an open position against said guides, the improvement which comprises a projection extending from said rotatable plate through said support bearing to the opposite side of said bearing from said plate, said support having a spherical and a cylindrical bearing surface in engagement with each other, and a loading mass connected at the end of said projection and having a weight sufficient to bring the center of gravity of the rotating system comprising said plate, said projection, and said mass into coincidence with the center of said spherical bearing surface in said support bearing to eliminate valve plate overturning forces otherwise generated by reciprocation of said valve plate.

10. An apparatus according to claim 9 wherein said rotatable valve plate is provided with a saw-tooth periphery for engaging with means to rotate said plate, said saw-tooth periphery being disposed substantially in the same plane with the center of said spherical bearing surface to eliminate plate overturning forces otherwise generated by the plate rotation forces.

11. An apparatus according to claim 9 wherein said spring-loaded support bearing comprises an inner collar supported at one end thereof on said shaft and having a cylindrical bearing surface therein, said valve plate being disposed across the other end of said inner collar, an outer collar attached at one end to said valve plate and surrounding said inner collar leaving an annular space therebetween, a compression spring disposed within said annular space, a bearing within said annular space at one end of said spring to permit said valve plate to rotate, and a projection having an outer spherical bearing surface and extending from said plate substantially entirely through said inner collar and forming a spherical-cylindrical support bearing therewith in which the spherical element rotates relative to the cylindrical element.

12. An apparatus according to claim 9 wherein said spring-loaded support bearing comprises a cylindrical projection having an external spherical portion supported at the end of said shaft, a compression spring associated with said projection, said projection extending into a cylindrical collar attached to the valve plate structure forming a spherical-cylindrical support bearing in which the cylindrical element rotates relative to the spherical element.

(References on following page)

References Cited in the file of this patent

UNITED STATES PATENTS

| | | |
|---|---|---|
| 717,122 | Roesch | Dec. 30, 1902 |
| 1,803,889 | Bohnhardt | May 5, 1931 |
| 1,826,941 | LaMont | Oct. 13, 1931 |
| 2,065,637 | Williams | Dec. 29, 1936 |
| 2,598,381 | Hoffman | May 27, 1952 |
| 2,711,332 | Audemar | June 21, 1955 |

FOREIGN PATENTS

| | | |
|---|---|---|
| 22,909 | Great Britain | Mar. 8, 1905 |
| 583,438 | France | Oct. 30, 1924 |